March 11, 1969     P. R. SCHULZ     3,432,282
METHOD FOR ADJUSTING CONTACTS IN REED SWITCHES
Filed Oct. 9, 1962     Sheet 1 of 5

*INVENTOR*
PETER R. SCHULZ
BY Donald R. Campbell
*ATTORNEY*

United States Patent Office 3,432,282
Patented Mar. 11, 1969

3,432,282
METHOD FOR ADJUSTING CONTACTS IN REED SWITCHES
Peter R. Schulz, Endwell, N.Y., assignor to International Business Machines Corporation, New York, N.Y., a corporation of New York
Filed Oct. 9, 1962, Ser. No. 229,457
U.S. Cl. 65—32                12 Claims
Int. Cl. C03b 23/20, 23/12

ABSTRACT OF THE DISCLOSURE

Process for adjusting the orientation of contacts in an encapsulating tube by heating the tube until the tube material softens sufficiently to permit distortion and subsequently distorting said tube until the desired orientation of contacts therein is obtained.

---

This invention relates to the manufacture of dry reed switches, and more particularly to a batch process for manufacturing a large number of dry reed switches at the same time.

As is well known, the dry reed switch basically comprises two overlapping magnetic cantilever beams surrounded by a dry inert gas and sealed in a glass envelope. Upon the application of a magnetic field, the reeds are attracted together to close the switch. The time required for the reeds to close upon one another depends largely on the separation or gap between the two reeds, but also varies with other factors such as the reed spring constant, position of the glass seals, the amount of reed overlap, and the magnetic properties of the reed. Difficulty has been experienced in economically manufacturing large quantities of reed switches with the desired operating characteristics.

An object of the present invention is to provide a generally improved and more satisfactory method for manufacturing dry reed switches having closing or operating times within predetermined limits.

Another object is the provision of a batch process for manufacturing large numbers of reed switches reliably and economically.

Yet another object is to provide a new and improved process for assembling and sealing a plurality of reed switches and thereafter adjusting the gap between the reeds of each switch to secure the desired operating characteristics.

A further object of the invention is the provision of a batch assembly apparatus for assembling and sealing about 100 to 400 glass reed switches at a time.

A still further object is to provide an apparatus of the foregoing type so designed that the contact ends of the reeds overlap by a controlled amount and are otherwise aligned.

In accordance with the invention, the reeds per se are formed from magnetic wire and sent by batches through cleaning, deburring, reducing, plating, and heat treating operations. Glass tubes are also cleaned and dried by the batch. A batch assembler is provided for locating the reeds within the glass tubes and for sealing the tubes to the reeds in a substantially inert atmosphere. The batch assembly apparatus comprises a bottom and a top reed holder, a glass tube carrier, two heater assemblies, and a locating fixture. Reeds are loaded into the locating fixture and the tips are releasably clamped to define precisely the positions of the contact ends realtive to one another. The bottom and top reed holder are similar and each contains a cavity filled with a low-melting alloy or similar substance which preferably goes from the solid to the liquid state at temperatures below about 200° F. The locating fixture is placed down over guide means on the bottom reed holder to immerse the free ends of the reeds into the binary state clamping medium which has been liquefied by passing steam through passages in the holder. Cold water is now run through the holder to solidify the low-melting alloy. The other set of reeds is positioned in the top reed holder in like manner.

Glass tubes are loaded into their carrier. The various parts are assembled sandwich fashion built up of the bottom reed holder, a heater assembly, the glass tube carrier, the other heater assembly, and the top reed holder. The assembly is placed under a bell jar and magnets are placed above and below to hold together the overlapping reed contact ends during sealing of the glass. The bell jar is evacuated and filled with nitrogen or some other suitable inert gas. The heaters are energized to melt the glass, thus sealing the reeds.

In a post adjust machine, the ends of the glass envelope of a switch are held respectively between a pair of stationary jaws and a pair of movable jaws. The center of the glass envelope is heated, and the movable jaws are adjusted relative to the stationary jaws to progressively increase (or decrease) the gap between the reeds. The adjustment proceeds until the operating time of the switch is satisfactory.

The foregoing and other objects, features and advantages of the invention will be apparent from the following more particular description of a preferred embodiment of the invention, as illustrated in the accompanying drawings, wherein.

Figure 2:
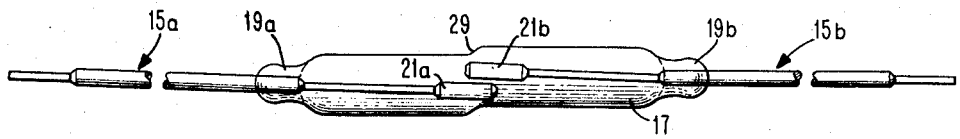
FIGS. 2 and 3 are side and top views, respectively, of the dry reed switch produced by the present process.
Figure 3:
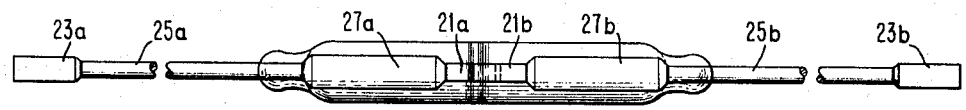

Referring to FIGS. 2 and 3, the dry reed switch to be manufactured by the process and apparatus to be described comprises two reeds 15a and 15b of magnetic material supported as overlapping cantilevers and hermetically sealed inside a glass envelope 17. The sealing of the ends of the glass envelope 17 to the reeds produces reduced diameter glass seals 19a and 19b at either end of the envelope. The overlapping contact ends 21a and 21b of the two reeds are separated by about three thousands of an inch, and the reeds are drawn together when a magnetic field is applied by a surrounding operating coil (not here shown) or is biased by a magnet. The glass envelope 17 frees the contact from all external environmental affects such as dirt, corrosive fumes, or variations in barometric pressure. It also encloses the most favorable gaseous environment, such as dry nitrogen, for the operation of the contacts. It will be noted that the reed 15a has a flattened end portion 23a and a substantially cylindrical shank 25a external to the glass seal 19a. Substantially within the glass envelope 17 is a wider relatively thin flexing section 27a which connects with the somewhat thicker contact end 21a. The other reed 15b has corresponding parts 23b, 25b and 27b. The post adjustment of the reed switch produces a bend or discontinuity 29 in the glass envelope 17 produced by adjusting the gap or separation between the contact ends 21a and 21b in a manner to be explained in greater detail hereafter.

Before taking up the batch assembler and the post adjustment, machine, a brief review will be made of the preparation of the reeds per se and of the glass tubes. The reeds are stamped out of round wire having the proper tensile strength and temper. First the reeds are formed on a punch press or four-slide and checked for dimensional accuracy. Next they are cleaned in a basket using ultrasonic cleaning or a vapor degrease. Then the reeds are loaded into a process carrier, which is a fixture having water cooled passages and a cavity filled with a low-melting bismuth alloy having a melting temperature of about 155° F. Steam is run through the passages to melt the low-melting alloy prior to dipping the shank ends of the reeds into the alloy, and then water is run through the passages to solidify the alloy to releasably clamp the end portions. At this point the reeds are approximately parallel to one another with their contact ends projecting approximately perpendicular away from the surface of the solidified low-melting alloy.

The reeds are cleaned again and then put through an electro-deburring or electro-polishing process to remove approximately 6 to 7 ten thousands of metal on the contact and flexing areas to insure a burr free part. After an acid pickling to remove oxides and phosphorous and nitrogen products deposited during electropolishing, the reeds are rinsed with water and the contact ends only are gold plated. There follows a heat treatment to diffuse the gold into the reed surface and anneal the reed materials. The contact ends are reduced in acid solution and the completed reeds are rinsed and dried. The reeds may now be unloaded from the process carrier by melting the low-melting alloy with low pressure steam. The glass tubes are prepared simply by cleaning thoroughly and drying.

The reeds are now ready to be assembled into the glass tubes and sealed. According to the invention, the batch assembler is arranged to assemble and seal in the order of about 100 to 400 reed switches at the same time. That is to say, about 100 to 400 sets of reeds are assembled into a like number of glass tubes by a batch process, and are sealed simultaneously. The batch assembler apparatus to be described is adapted for manually operation, however it will be understood that apparatus of a similar character and based on the same principals may be designed for a semi-automatic operation.

Figure 1:
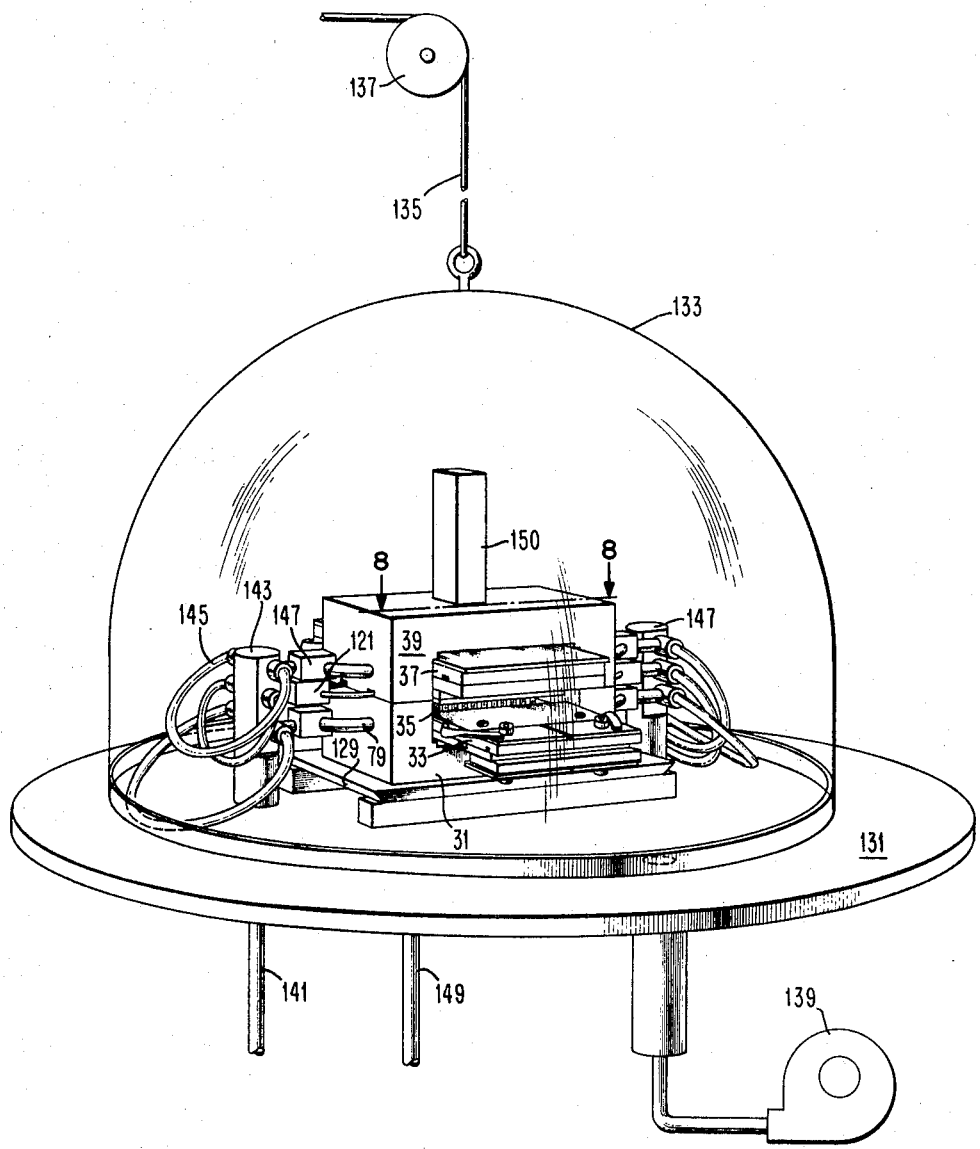
FIG. 1 is a perspective view of the batch assembler under a bell jar, the connections to a vacuum pump and to sources of power, water and inert gas being shown schematically.
Figure 8:
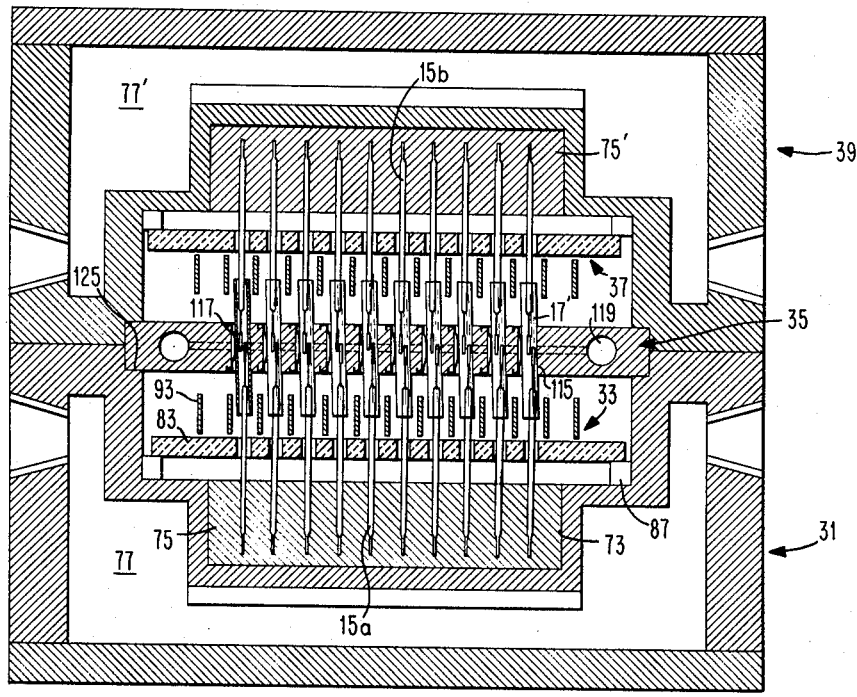
FIG. 8 is a cross-sectional view of the completely assembled batch asembler taken approximately on the line 8—8 of FIG. 1.

Referring to FIGS. 1 and 8, the batch assembler comprises five main parts which can be assembled together overlying one another in sandwich fashion. The five separable main parts are a bottom reed holder 31, a lower heater assembly 33, a glass tube carrier 35, an upper heater assembly 37, and a top reed holder 39. The function of the batch assembler is to assemble the sets of reeds 15a and 15b within the glass tubes 17′, after which the heater assemblies are energized to melt the ends of the glass tubes and cause them to seal about the reeds. The reed switches in this apparatus are assembled closed upon one another and are sealed in a partial vacuum with a controlled atmosphere. After being removed from the batch assembler the switches are sent to a post adjust machine where the reeds of each switch are adjusted from one another in a lateral direction so that the switch has the proper closing time.

The batch assembler also includes a locating fixture 41 (FIGS. 4 and 5) for accurately loading the sets of reeds into the bottom and top reed holders 31 and 39. As illustrated, the locating fixture 41 conveniently comprises a rigid rectangular frame having two side members 43 and 45 and two end members 47 and 49. A pair of end blocks 51 and 53 are integral with the respective side members and have slots 55 and 57 for receiving upstanding guide posts 59 and 61 on the reed holders, the bottom reed holder 31 being shown here.

At the center of the locating fixture 41, supported at the sides by the side members 43 and 45 and at the ends by the end blocks 51 and 53, is an assemblage of metallic strips constructed to define a plurality of rectangular slots 63 arranged in rows. Each of the slots 63 receives the contact end 21a or 21b of a set of reeds, one reed to a slot. As illustrated there are 10 rows of 10 slots, making 100 slots in all to accommodate 100 reeds. The reed contact ends are releasably clamped against one side of the slot by means of a plastic tube 65 which is threaded to contact each slot and is bent over at the side of the frame and returned to a similar set of slots on the other side of the fixture. It will be understood that the tube 65 is a single continuous tube which can be connected to a source of air power so as to inflate all portions of the tube at the same time. Inflating the tube 65 urges the contact ends of the reeds which have been inserted into the slots 63 against the accurately ground flat defining one side of the slot to releasably clamp them in place. It is essential that the contact ends of the reeds be accurately located with respect with one another and in approximate parallelism. Thus the side of the slot 63 against which the reed is urged by inflation of the plastic tube is a controlled dimension, as is the bottom 67 of the slot against which the reed end grounds upon being inserted.

After releasably clamping the contact ends of all 100 reeds in the locating fixture 41, the fixture is turned over so that the projecting end of the reeds point downwardly and is placed upon the guide posts 59 and 61 on the bottom reed holder 31. At one end a conventional spring urged plunger mechanism 67 supported on the frame end member 47 presses against the guide post 59. At the other end a suitable micrometer device 69 is supported on the frame member 49 and in the usual manner is turnable to engage the end of its shaft 71 with the other guide post 61. By adjusting the micrometer, the entire locating fixture 41 is movable to the left and to the right with relation to the guide posts 59 and 61 which serve as a reference or guide line.

Figure 5:
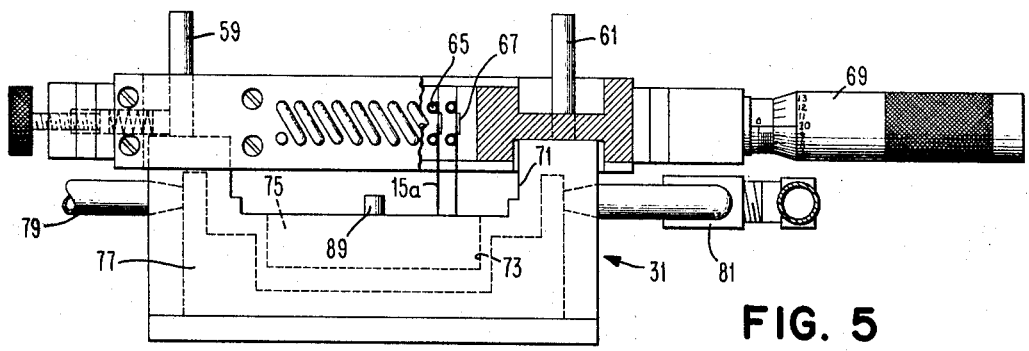
FIG. 5 is a side view of the apparatus of FIG. 4, parts being broken away and shown in section.
Figure 7:
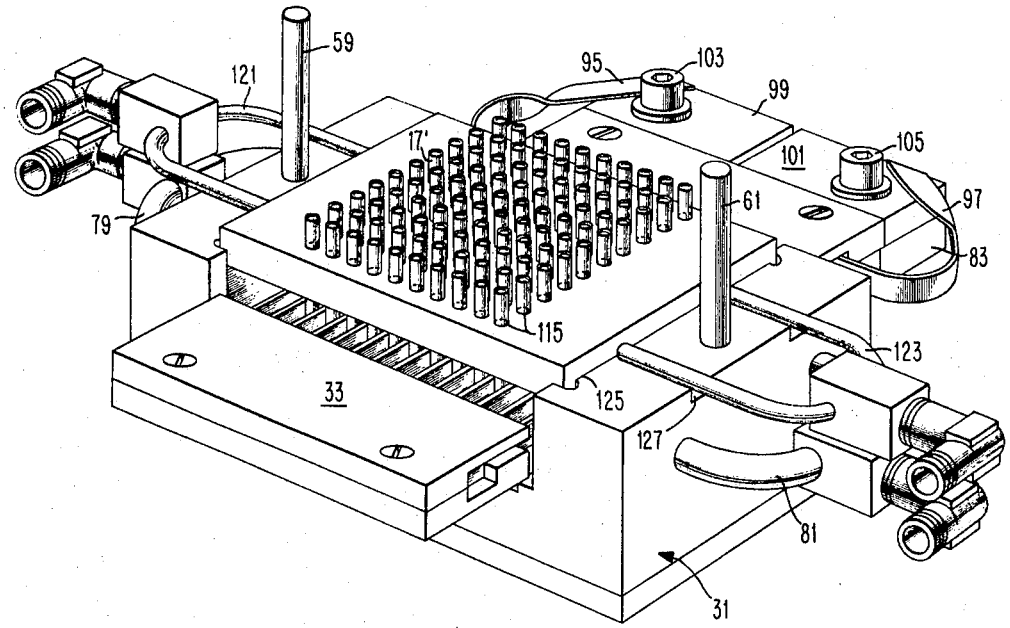
FIG. 7 is a perspective view of the partially assembled batch assembler.

As best shown in FIGS. 5, 7 and 8, the bottom reed holder 31 is essentially U-shaped with the guide posts 59 and 61 removably secured to the centers of the upstanding ends. The top reed holder 39 is similar and will not be described in detail. Between the upstanding ends of the holder 31 is a cavity 73 filled with a binary state medium conveniently having a relatively low melting temperature. A desirable binary state (liquid-solid) medium to use is a low-melting quaternary alloy of bismuth, tin, lead and cadmium of the eutectic type having a melting temperature of about 155° F. Such a low-melting alloy is liquefied by being exposed to steam and is solidified by being exposed to cold water. For this purpose, the reed holder 31 has an internal passage 77 connected with suitable inlet plumbing 79 and outlet plumbing 81. In operation, steam is run through the passage 77 to liquify the pool 75 of low-melting alloy, and the shanks of the reeds 15a dip into the liquid metal when the locating fixture 41 is placed on top of the bottom reed holder 31. Then cold water is run through the passage 77 to solidify the pool 75 of low-melting alloy. Upon deflation of the plastic tube 65, the locating fixture can be removed.

The advantage of using a binary state system to clamp the reeds is that in clamping no stresses are introduced into the reed and therefore upon removal of the locating fixture 41 the reed contact ends, which project above the surface of the solidified low-melting alloy, remain as positioned by the locating fixture. The reed holder 31 is not adversely affected by bent reeds since the location of the reeds is not dependent on the shank of the reed. That is, if the shanks of the reeds are slightly bent and not exactly parallel to one another, this makes no difference since they will be releasably clamped in the binary state medium at exactly the same location from one another.

The contact ends remained accurately positioned with respect to one another whether the shanks are bent or not. Another distinct advantage of this method of clamping in the reed holder is that control of overlap of the two contact ends in the finished switch is no longer dependent upon controlling the length of the reed. Due to the controlled position of the bottom 67 of the slot 63 of the locating fixture 41, the tips of the contact ends of the various reeds of the set lie in substantially the same plane. Another binary state medium which can be used is paraffin, although the results are not as good as for the low-melting bismuth alloy wherein a preferred composition is 50% bismuth, 25% lead, 12.5% tin and 12.5% cadmium.

Figure 6:
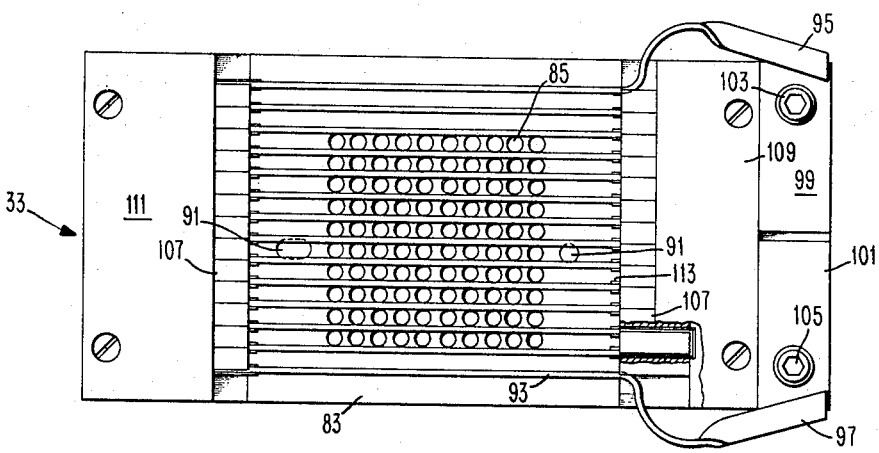
FIG. 6 is a plan view of a heater assembly.

The two heater assemblies 33 and 37 are identical. Referring to FIGS. 6, 7 and 8, the lower heater assembly 33 comprises an underlying base plate 83 having a central group of holes 85 arranged in rows to correspond to the spacing of the reeds clamped in the low-melting alloy in the lower reed holder 31. Thus in assembling the batch assembler, the heater assembly 33 is oriented at right angles with the lower reed holder 31 and lowered down into place with each of the reeds passing through one of the holes 85. The reed holder 31 has opposing ledges 87 to elevate the base plate 83 above the surface of the pool 75 of low-melting alloy. Two locating studs 89 (FIG. 5) at the side of the reed holder 31 are received in correspondingly located holes 91 in the base plate 83 to assure proper registry between the two parts. The heating element is a sinuously wound strip 93 of metal suitable for resistance heating, such as a nickel-chromel alloy, and will be understood to be a single continuous strip having turned ends 95 and 97 which respectively engage terminal plates 99 and 101. The terminal plates 99 and 101 are mounted on an insulator above the base plate 83, and connections to a source of power for resistance heating of the strip 93 are obtained by making connections to posts 103 and 105.

The heating element 93 has rows of substantially parallel strips spaced to correspond with the spacing of the rows of holes 85. The sides of the strips, just inside the bends from one row to the next, are retained in slots between opposing rows of ceramic insulating spacers 107. The row of spacers 107 on one side are secured in place by a clamping plate 109 mounted on the base plate 83, while the other row of spacers at the other side are clamped to the base plate by a similar clamping plate 111. At the bends where the heater strips pass through the ceramic spacers 107 which elevate them above the surface of the base plate 83, the area has been increased by the welding of short strips 113 to either side of each heater strip. This added area reduces the temperature at this location and allows the ceramic to be much cooler. It will be noted that both sides of the heater strips are held in opposing aligned slots so that the expansion is in one direction (along its length).

The straight strip heaters yield good glass to metal seals and are superior to "egg crate" or honeycomb heater designs. At the elevated temperatures used to seal the glass tubes, heating is primarily by radiation. For uniform heating throughout the switch grid, at least two rows of heaters are required beyond the outside switch row. These two rows have much larger heat sinks available to them as opposed to the remainder of the heater rows adjacent to them.

The glass tube carrier 35 (see FIGS. 7 and 8) is essentially a flat plate having a grid of bores 115 into which the glass tubes 17' can be inserted, projecting out from either side by a like amount. A spring 117 is associated with each of the bores 115 to retain the glass tube in place. Water passages 119 are provided for the interior cooling of the carrier during sealing. Inlet plumbing tubes 121 are connected to one side of the holder, and at the other side is a similar outlet plumbing fixture 123. The reed holders 31 and 39 are relieved as illustrated at 125 and 127 to receive the carrier itself and the tubes of the plumbing fixtures when the parts are assembled together.

Figure 4:
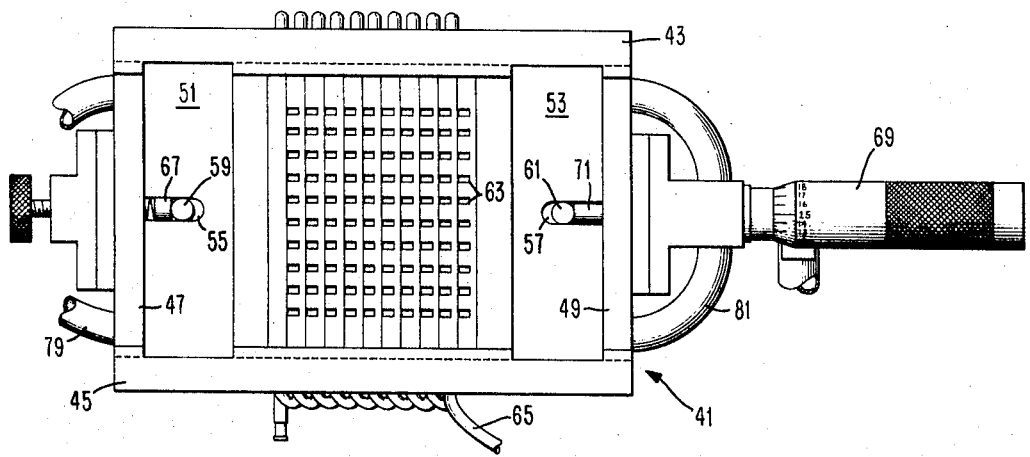
FIG. 4 is a plan view of the locating fixture assembled on a reed holder.

The operation of the batch assembler to this point will be reviewed. Referring to FIGS. 4 and 5, the first step is to load one side of the locating fixture 41 with the one set of reeds 15a. The reeds are inserted contact end 21a down into the slots 63 until bottoming against the bottom 67 of the slot. The inner portion of each slot 63 has the same profile as the reed tip, and the bottom of the slot is a controlled dimension because it determines the overlap between the two reeds in the finished switch. The plastic tube 65 is now expanded by air pressure, and this forces the tip of the contact end of each of the reeds against the flat block forming one side of the slot in order to assure parallelism in the final switch. The micrometer 69 is now set to the proper setting to center the reeds with respect to the glass tubes 17', using the guide post 61 as a reference line. In the meantime steam has been run through the passages 77 in the lower reed holder 31 in order to liquify the pool 75 of low-melting alloy. The locating fixture 41 with the one set of reeds releasably clamped in the slots 63 by the inflated tube 65 is lowered down over the guide posts 59 and 61 on the lower reed holder 31. The shanks of the reeds 15a dip into the liquefied low-melting alloy pool 75. Cold water is run through the passages 77 in the reed holder 31 to solidify the low-melting alloy, and the plastic tube 65 is deflated so that the locating fixture 41 may now be lifted off of the reed holder.

At this point the one set of reeds 15a are projecting contact end up approximately perpendicular to the surface of the solidified pool 75 of low-melting alloy. Even though slightly bent, the shank ends of the reeds 15a are clamped in the solidified pool 75 in whatever orientation they had in the locating fixture 41. The contact ends 21a, however, are accurately spaced from one another in approximately parallel rows. The other set of reels 15b are now loaded into the other side of the locating fixture 41. The plastic tube 65 is inflated to releasably clamp the tips of the contact ends of the reeds 15b in their slots. The setting of the micrometer 69 is changed to displace the reeds 15b from the previous setting for the reeds 15a by a distance slightly greater than the thickness of the contact ends of the reeds. This is to assure that the reeds do not strike each other when assembled into the glass tubes 17'. The guide post corresponding to the post 61 is used as a reference line. Steam is run through the passages 77' in the top reed holder 39 (FIG. 8) in order to liquify the pool 75'. In a manner to that previously described, the fixture 41 is lowered down over the guide posts on the holder so that the shank ends of the reeds 15b dip into the pool 75', after which cold water is run through the passages 77' to solidify the pool. The tube 65 is deflated before removing the locating fixture 41, and the guide posts corresponding to the posts 59 and 61 (not here shown) are removed from the top reed carrier 39.

The glass tube carrier 35 (see FIGS. 7 and 8) is loaded with the glass tubes 17'. The glass tubes project from either side of the holder 35 by approximately an equal amount and the corresponding ends are even with one another. The bottom and top reed holders 31 and 39, the two heater assemblies 33 and 37, and the glass tube carrier 35 may now be assembled one upon the other in sandwich fashion. The lower heater assembly 33 is placed on the bottom reed holder 31 with their long axes approximately mutually perpendicular, and with the contact ends of the set of reeds 15a extending up through the holes 85 in the base plate 83 (FIG. 6). The edges of the base plate 83 rest on the ledges 87 on the bottom reed holder, and the locating studs 89 (FIG. 5) extend into the apertures 91 in the base plate 83 to assure proper registry between the two parts. Upon placing the glass tube carrier into the recesses 125 and 127 in the bottom reed holder 31, it is seen that the bottom ends of the tubes 17' partially overlap the parallel strips of the heating element 93. The other heater assembly 37 is assembled onto the top reed holder 39. The two parts can now be assembled on top of the glass tube carrier and the bottom reed holder.

The reed switches are sealed in a partial vacuum in the most favorable gaseous environment for the operation of the contacts. High purity dry nitrogen is desirably used. To this end, the assembled batch assembler is placed upon a platform 129 (see FIG. 1) located on the work table 131 of a vacuum system illustrated here schematically. A bell jar 133 can be raised above and lowered onto the table 131 by means of a cord 135 attached to the bell jar and running around a pulley 137. A vacuum pump is illustrated diagrammatically at 139. Pipe 141 supplies cold water to a distributing fixture 143 located within the sealing area of the vacuum system, and the distributor 143 is in turn connected by means of hoses 145 with the pumbing connections 79 and 121 on the bottom reed holder and glass carrier, respectively. The top reed holder 39 has a similar plumbing connection 147 which is also connected in. Water discharging from the two reed holders and the glass carrier passes through a discharge plumbing fixture 147 and out a discharge pipe 149. Cooling of the batch assembler during sealing is very important because any thermal expansion would be detrimental to the reed gap. Also the low-melting alloy which holds the reeds needs to be kept from melting. Not shown in FIG. 1 are the power connections for the two heater assemblies 33 and 37.

The procedure for sealing in the glass tubes 17' will now be described. Oppositely poled magnets 150 (the bottom magnet is not visible in FIG. 1) are placed above and below the batch assembler to cause the reeds of each switch to close upon one another. The use of magnets in this manner is desirable, though not essential, since it reduces the amount of post adjusting of the gap between the reeds. After lowering the bell jar 133, the heaters 33 and 37 are energized for about one minute to oxidize the seal area to insure a positive glass-to-metal seal. When cool, the vacuum system is started and continued until the pressure of about 50 microns of mercury is reached. The sealing atmosphere is provided by introducing high purity dry nitrogen into the bell jar until about 23" Hg gauge pressure is reached. The cooling water and the power to the heater assemblies is turned on. After about 2½ minutes the nitrogen pressure is raised to 30" Hg (i.e. atmospheric pressure) which pushes the molten glass against the reeds to form strong compression seals. Turning to FIGS. 2 and 3, it will be noted that the glass seals 19a and 19b have a smaller diameter than the main envelope 17. This is another desirable result of raising the nitrogen pressure to atmospheric toward the end of the sealing operation. After cooling for a short time the bell jar 133 is removed. The cooling water is shut off and disconnected. Then low pressure steam is run through the reed holders 33 and 39 to melt the low-melting alloy so that the reed shanks can be removed from the batch assembly fixture. The completed reed switches are transferred to a conventional leak test station.

The reed switches as taken from the batch assembler are sealed with their contact ends in closed position or only slightly separated. As was mentioned previously with regard to the discussion on FIGS. 2 and 3, the bend 29 in the glass envelope 17 is produced by the post adjustment of the gap between the overlapping contact ends 21a and 21b of the two reeds. The post adjustment technique involves essentially heating the glass in the center of the envelope 17 in the area of the overlapping contact ends, and then removing one end of the tube relative to the other end to progressively approach the desired separation between the reeds. The time required for the reeds to close upon one another depends largely on the separation or gap between two reeds, but also varies with other factors such as the reed spring constant, the position of the glass seals, the amount of reed overlap, and the magnetic properties of the reed. In the present case it is desired to manufacture a reed switch having an operating or closing time within predetermined limits. For this purpose, the operating time of the reed switch being adjusted is tested as the gap is increased (or decreased) progressively, and the adjustment ends when the operating time is satisfactory.

Figure 9:
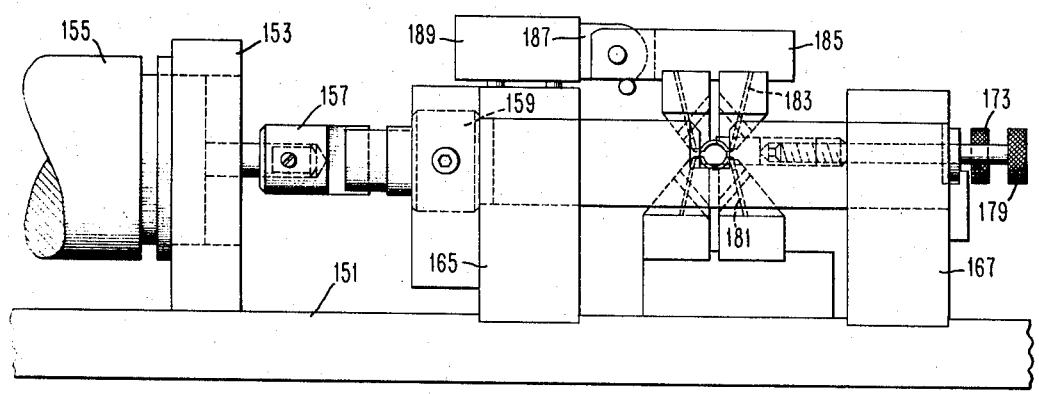
FIG. 9 is a side view of a post adjust machine for adjusting the gap between the reeds.
Figure 10:
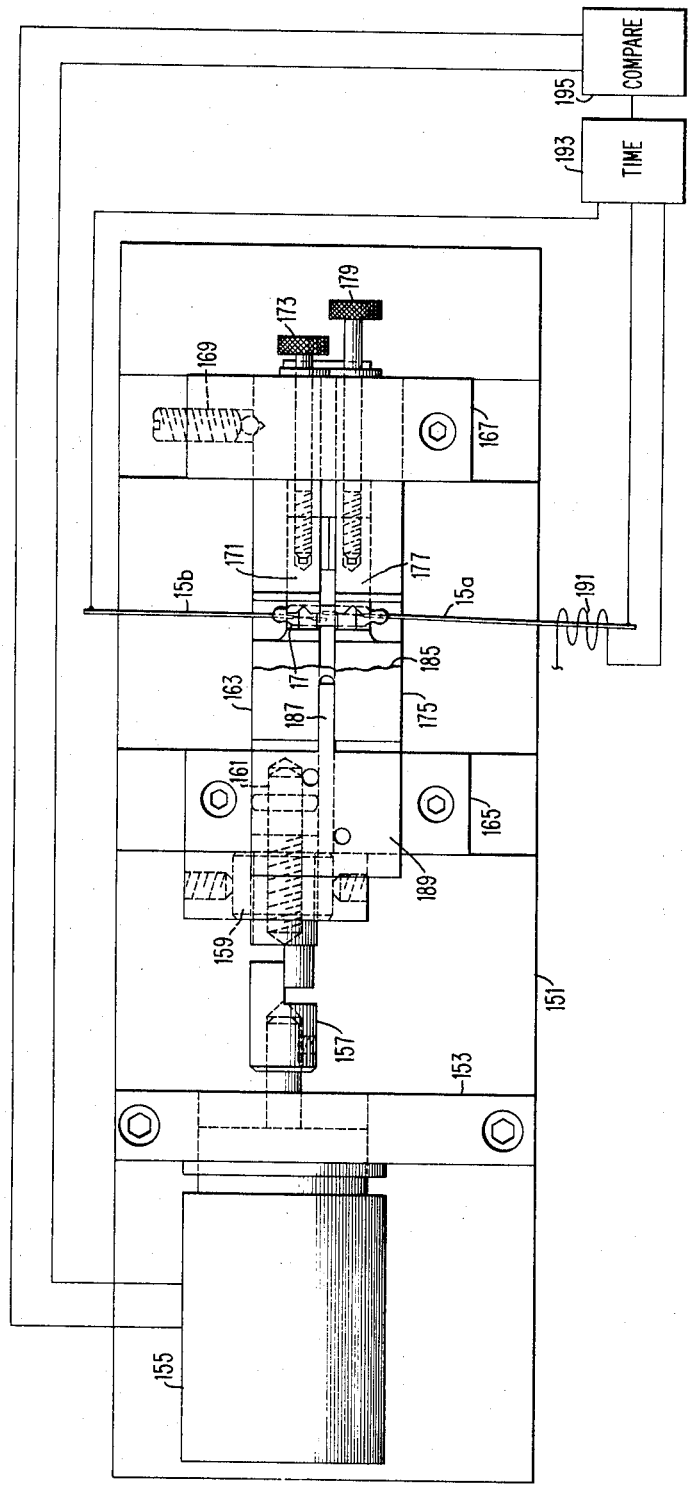
FIG. 10 is a plan view of the post adjust machine shown in FIG. 9, parts being shown broken away, and includes a schematic of an electrical circuit for testing the closing time of the reed switch during adjustment.

The post adjustment machine is shown in FIGS. 9 and 10. The base plate 151 has at one side an upstanding bracket 153 which supports a reversible stepping motor 155 having a coupling 157 with the input of a conventional differential bolt mechanism indicated generally at 159. The differential bolt mechanism gears down the high revolutions of the stepping motor 155. The output screw 161 of the differential bolt device is operatively engaged with a movable jaw assembly 163. A centrally located upstanding bracket 165 on the base plate supports the differential bolt device and also one end of the movable jaw assembly 163. The other end of the movable jaw assembly is supported by a third upstanding bracket 167, and it is to be understood that the movable jaw assembly slides to the left (or the right) as the stepping motor operates. Detent 169 retains it in a home position. The movable jaw assembly includes a retractable clamp portion 171 operated by a hand screw 173. A stationary jaw assembly 175 is provided for engaging the other end of the envelope 17 of the reed switch to be adjusted. The stationary jaw assembly is mounted on the brackets 165 and 167 approximately parallel to the movable jaw assembly 163 but spaced laterally from it. A movable clamp portion 177 is provided and is operated by a hand screw 179. By retracting the movable clamp portions 171 and 177, the envelope 17 of the switch to be adjusted can be inserted, and upon turning closed the hand screws 173 and 179 is firmly held in place at either end. The central portion of the envelope 17 is not engaged.

A lower heating element 181 is suitably supported on the base plate and extends upwardly in the space between the movable jaw assembly 163 and the stationary jaw assembly 175. The central portion of the heating element 181 has a semi-circular configuration so as to closely surround the bottom side of the envelope 17. The upper heating element 183 has a similar but opposing configuration and is swingably supported on a pivoted arm 185 for movement into and out of the space between the two jaw assemblies. The arm 185 is pivoted on a hinge 187 supported on a block 189 which is fastened to the top of the bracket 165.

In order to determine when the proper closing time of the switch has been obtained during adjustment, a circuit is provided to measure the closing time, compare it to see if it falls within predetermined limits, and to automatically actuate the stepping motor 155 if the measured time is outside those limits. An electromagnet 191 is provided for creating a magnetic field to close the reed switch and is shown here diagrammatically. A timer unit 193 has connection with both ends of the reed switch and with the electromagnet 191. The measured closing time is compared in a suitable circuit 195 having connection with the digital stepping motor 155.

In the operation of the post adjust machine of FIGS. 9 and 10, the hand screws 173 and 179 are loosened to retract the gripping clamps 171 and 177, and the reed switch envelope 17' is inserted between the pairs of gripping jaws from the side with the overlapping contact ends of the reed switch aligned approximately with the space between the movable jaw assembly 163 and the stationary jaw assembly 175. The hand screws 173 and 179 are tightened to clamp either end of the envelope 17. The heating elements 181 and 183 are energized to soften the central portion of the glass envelope 17. Due to incomplete cancellation of the heater flux, the heaters are cyclically pulsed so that the heaters are off during measurement but back on as the switch is adjusted. During adjustment, the digital motor 155 operates alternately with the testing of the closing time by pulsing the electromagnet 191 and measuring the closing time and comparing it with a predetermined set of limiting values. The stepping motor 155 operates through the differential bolt mechanism 159 to turn its lead screw 161 and draw the movable jaw assembly 163 inwardly (or outwardly). The movable jaw assembly 163 adjusts relative to the stationary jaw assembly 175 until the gap between the reeds is satisfactory.

The batch process for manufacturing dry reed switches which have been described has obvious economic advantages. Although a batch assembly for 100 reeds has been illustrated, batches assemblers for batches of up to about 400 reeds are feasible. For the larger batch sizes, it may be desirable to divide the low-melting alloy pool 75 into two sections to prevent uneven freezing of the alloy with resultant distortion of the position of the reed shanks dipping into it. Further economic advantages can be achieved by arranging for a semi-automatic operation. Thus, the various parts of the batch assembler can be arranged as slide-in magazines to a fixture for automatically moving them together in sandwich form. Furthermore, it is not necessary that the locating fixture 41 have opposing pairs of slots 63; in a precision made fixture one set of slots 63 is sufficient. The post adjustment of the gap between the overlapping contact ends of the reeds makes for a precision product having an operating time of known dependable characteristic, while permitting the economic advantage of sealing in the reeds with various gap widths or closed upon one another.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The batch process for the manufacture of dry reed switches each including a pair of magnetic reeds sealed in a tubular glass envelope and having overlapping contact ends and oppositely extending shank ends, comprising the steps of releasably clamping the contact ends of a first set of reeds in substantial parallelism in accurately located positions relative to one another, and doing likewise for a second set of reeds, clamping the shank ends of each of the sets of reeds in predetermined positions relative to a reference line and thereafter releasing the contact ends, the positions of the second set of reeds being laterally spaced from the positions of the first set of reeds by a distance slightly greater than the thickness of the reed contact ends, clamping a set of aligned glass tubes in a pattern corresponding to that of the sets of reeds in positions relative to the reference line, inserting the contact ends of the two sets of reeds into opposite ends of the glass tubes until the desired amount of overlap is present, heating the ends of the glass tubes in a controlled atmosphere to hermetically seal the ends of each of the glass tubes to its respective reeds, and post adjusting the separation between the overlapping contact ends of the reeds of each switch to give a satisfactory closing time by heating the central portion of the envelope until the glass is yieldable and moving one end of the glass envelope in a predetermined lateral direction with respect to the other end.

2. The batch process for the manufacture of dry reed switches each including a pair of magnetic reeds sealed in a tubular glass envelope and having overlapping contact ends and oppositely extending shank ends, comprising the steps of releasably clamping the contact ends of a first set of reeds in substantial parallelism in accurately located positions relative to one another in a rectangular grid pattern, and doing likewise for a second set of reeds, clamping the shank ends of each of the sets of reeds in predetermined positions relative to a reference line and thereafter releasing the contact ends, the positions of the second set of reeds being laterally spaced from the positions of the first set of reeds by a distance slightly greater than the thickness of the reed contact ends, clamping a set of aligned glass tubes in a pattern corresponding to that of the sets of reeds in positions relative to the reference line, inserting the contact ends of the two sets of reeds into opposite ends of the glass tubes until the desired amount of overlap is present, magnetizing the sets of reeds to cause respective pairs of the reeds to close upon one another, heating the ends of the glass tubes in a controlled atmosphere to hermetically seal the ends of each of the glass tubes to its respective reeds, and post adjusting the lateral separation between the overlapping contact ends of the reeds of each switch by heating the central portion of the envelope until the glass is yieldable, and moving one end of the glass envelope in a predetermined lateral direction with respect to the other end and testing the closing time of the switch until the closing time is within predetermined limits.

3. The method of making a switch having reed contacts sealed in a glass tube, said tube having a long axis, comprising the steps of sealing a plurality of reed contacts in the ends of a glass tube in overlapping relation to one another in the plane of said long axis, clamping each end of the sealed tube in a suiable clamping member, heating a portion of the tube intermediate its ends until said portion becomes softened, and deforming said tube while said portion is soft by moving one clamping member with respect to the other a spaced distance in a direction perpendicular to the long axis of said tube whereby the orientation of overlapping reed contacts is adjusted.

4. The method of making a switch in accordance with claim 3 wherein the step of sealing a plurality of reed contacts in the ends of said glass tube comprises sealing a first reed contact in one end of said tube and sealing a second reed contact in the other end of said tube in an overlapping relation with said first reed.

5. The process of adjusting the orientation of contacts in an encapsulating tube having a long axis comprising the steps of sealing at least one contact in each end of said tube, heating said encapsulating tube until the tube material softens sufficiently to permit distortion of said material, and thereafter distorting said tube until the desired orientation of contacts is obtained.

6. The process of adjusting the orientation of contacts sealed in an encapsulating tube in accordance with claim 5 wherein the contacts sealed in the ends of said tube are spaced in overlapping relation therein.

7. The process of adjusting the orientation of contacts sealed in an encapsulating tube having a long axis in accordance with claim 6 wherein one end of said tube is distorted with respect to the other end in a direction perpendicular to the long axis of said tube.

8. The process of adjusting the orientation of contacts sealed in an encapsulating tube having a long axis in accordance with claim 6 wherein said tube is heated and softened adjacent the area of contact overlap.

9. The method of adjusting the orientation of the contacts of a reed switch, said switch having oppositely extending overlapping reeds longitudinally sealed in a glass envelope, that comprises applying a clamp to each end of the envelope, softening an intermediate portion of the envelope, moving one clamp with respect to the other a controlled distance while said portion is soft to distort the envelope and move an associated reed sealed therein, and then hardening the softened portion of the envelope to retain the distortion.

10. The method of claim 9 in which the controlled distance is measured to space the contacts of the particular switch under adjustment from one another in their required relative positions.

11. The method of manufacturing dry reed switches each including a pair of magnetic reeds sealed in a tubular glass envelope and having overlapping contact ends and oppositely extending shank ends, comprising the steps of releasably clamping the contact ends of a first set of reeds in accurately located positions relative to one another, freezing the shank ends of said first act of reeds in a pool of binary state medium in predetermined positions relative to a reference line and thereafter releasing the contact ends thereof, releasably clamping the contact ends of a second set of reeds in the same pattern as said first set, freezing the shank ends of said second set of reeds in a second pool of the binary state medium in positions relative to the reference line which are laterally spaced from the positions of the first set of reeds by a distance slightly greater than the thickness of the reed contact ends, clamping a set of aligned glass tubes in a pattern corresponding to that of the sets of reeds in positions relative to the reference line, inserting the contact ends of the two sets of reeds into opposite ends of the glass tubes until the desired amount of overlap is present, heating the ends of the glass tubes in a controlled atmosphere to hermetically seal the ends of each of the glass tubes to its respective reeds, melting the pools of the binary state medium to release the shank ends of the reeds, post adjusting the gap between the overlapping contact ends of the reeds of each of the switches by heating the central portion of the switch envelope until the glass is yieldable, and moving one end of the envelope in a predetermined lateral direction relative to the other end to adjust the gap until the switch closes within predetermined time limits.

12. The batch process for the manufacture of dry reed switches each including a pair of magnetic reeds sealed in a tubular glass envelope and having overlapping contact ends and oppositely extending shank ends, comprising the steps of releasably clamping the contact ends of a first set of reeds in substantial parallelism in accurately located positions relative to one another, freezing the shank ends of said first set of reeds in a pool of binary state medium in predetermined positions relative to a reference line and thereafter releasing the contact ends thereof, releasably clamping the contact ends of a second set of reeds in the same pattern as said first set and in substantial parallelism to one another, freezing the shank ends of said second set of reeds in a second pool of the binary state medium in positions relative to the reference line which are laterally spaced from the positions of the first set of reeds by a distance slightly greater than the thickness of the reed contact ends, clamping a set of aligned glass tubes in a pattern corresponding to that of the sets of reeds in positions relative to the reference line, inserting the contact ends of the two sets of reeds into opposite ends of the glass tubes until the desired amount of overlap is present, magnetizing the sets of reeds to cause respective pairs of the reeds within each of the glass tubes to close upon one another, heating the ends of the glass tubes in a controlled atmosphere to hermetically seal the ends of each of the glass tubes to its respective reeds, melting the pools of the binary state medium to release the shank ends of the reeds, post adjusting the gap between the reeds of each of the switches by heating the central portion of the switch envelope until the glass is yieldable, and alternating moving one end of the glass envelope in a predetermined lateral direction relative to the other end and testing the closing time of the switch until the closing time is satisfactory.

References Cited

UNITED STATES PATENTS

| 2,508,018 | 5/1950 | Ellwood | 29—155.5 |
| 2,544,430 | 3/1951 | McCutchan | 29—155.5 |
| 2,697,307 | 12/1954 | Diehl et al. | 65—154 |
| 2,984,046 | 5/1961 | Brewer et al. | 65—154 |
| 995,537 | 6/1911 | Hertner | 269—7 |
| 2,586,309 | 2/1952 | Dales | 200—138 |
| 2,648,167 | 8/1953 | Ellwood | 29—203 |
| 2,882,648 | 4/1959 | Hovgaard et al. | 65—32 |
| 2,984,046 | 5/1961 | Brewer et al. | 65—276 |

DONALL H. SYLVESTER, *Primary Examiner.*

F. W. MIGA, *Assistant Examiner.*

U.S. Cl. X.R.

65—40, 42, 54, 59, 154, 155, 276; 29—199.5, 203, 155.5